(12) United States Patent
Ellison et al.

(10) Patent No.: US 7,900,248 B2
(45) Date of Patent: Mar. 1, 2011

(54) ACCESS CONTROL NEGATION USING NEGATIVE GROUPS

(75) Inventors: Carl Melvin Ellison, Seattle, WA (US); Paul J. Lach, Seattle, WA (US); Butler Wright Lampson, Cambridge, MA (US); Melissa W. Dunn, Woodinville, WA (US); Ravindra Nath Pandya, Clyde Hill, WA (US); Charles William Kaufman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/756,393

(22) Filed: May 31, 2007

(65) Prior Publication Data

US 2008/0301780 A1    Dec. 4, 2008

(51) Int. Cl.
*G06F 17/30* (2006.01)
(52) U.S. Cl. .................................. 726/10; 726/5; 726/3
(58) Field of Classification Search .................. 726/10, 726/5, 3
See application file for complete search history.

(56) References Cited

U.S. PATENT DOCUMENTS

| | | | |
|---|---|---|---|
| 5,283,830 A | 2/1994 | Hinsley et al. | |
| 5,315,657 A | 5/1994 | Abadi et al. | |
| 5,765,153 A | 6/1998 | Benantar et al. | |
| 5,825,877 A | 10/1998 | Dan et al. | |
| 6,321,334 B1 | 11/2001 | Jerger et al. | |
| 6,381,602 B1 | 4/2002 | Shoroff et al. | |
| 6,412,070 B1 | 6/2002 | Van Dyke et al. | |
| 6,487,605 B1 | 11/2002 | Leung | |
| 6,625,603 B1 | 9/2003 | Garg et al. | |
| 6,651,096 B1 | 11/2003 | Gai et al. | |
| 6,986,062 B2 | 1/2006 | Carpenter | |
| 6,990,492 B2 | 1/2006 | Gupta | |
| 7,065,783 B2 | 6/2006 | Rygaard | |
| 7,107,446 B2 | 9/2006 | Gensler, Jr. et al. | |
| 7,131,000 B2 | 10/2006 | Bradee | |
| 7,624,424 B2 | 11/2009 | Morita et al. | |
| 2003/0014636 A1 | 1/2003 | Ahlbrand | |
| 2003/0084331 A1 | 5/2003 | Dixon et al. | |

(Continued)

FOREIGN PATENT DOCUMENTS

WO     2006012589 A1     2/2006

OTHER PUBLICATIONS

Analysis and Protection of Dynamic Membership Information for Group Key Distribution Schemes; Sun, Y.L.; Liu, K.J.R.; Information Forensics and Security, IEEE Transactions on vol. 2 , Issue: 2; Publication Year: 2007 , pp. 213-226.*

(Continued)

*Primary Examiner* — David Y Jung
(74) *Attorney, Agent, or Firm* — Wolf, Greenfield & Sacks, P.C.

(57) ABSTRACT

The subject disclosure pertains to systems and methods that facilitate managing groups entities for access control. A negative group is defined using a base group, where the negative group associated with a base group includes any entities not included in the base group. Negative groups can be implemented using certificates rather than explicit lists of negative group members. A certificate can provide evidence of membership in the negative group and can be presented for evaluation to obtain access to resources. Subtraction groups can also be used to manage access to resources. A subtraction group can be defined as the members of a first group, excluding any members of a second group.

20 Claims, 13 Drawing Sheets

U.S. PATENT DOCUMENTS

| | | | |
|---|---|---|---|
| 2003/0088786 | A1 | 5/2003 | Moran et al. |
| 2004/0006621 | A1 | 1/2004 | Bellinson et al. |
| 2004/0039906 | A1 | 2/2004 | Oka et al. |
| 2005/0044396 | A1 | 2/2005 | Vogel et al. |
| 2005/0044399 | A1 | 2/2005 | Dorey |
| 2005/0055570 | A1 | 3/2005 | Kwan et al. |
| 2005/0135623 | A1 | 6/2005 | Bahr |
| 2005/0204133 | A1 | 9/2005 | LaLonde |
| 2005/0278785 | A1 | 12/2005 | Lieberman |
| 2006/0015741 | A1 | 1/2006 | Carroll |
| 2006/0031679 | A1 | 2/2006 | Soltis, Jr. et al. |
| 2006/0206707 | A1 | 9/2006 | Kostal et al. |
| 2007/0220614 | A1 | 9/2007 | Ellis et al. |
| 2007/0226488 | A1 | 9/2007 | Lin et al. |
| 2008/0052291 | A1 | 2/2008 | Bender |

OTHER PUBLICATIONS

Role-based access control for grid database services using the community authorization service; Pereira, A.L.; Muppavarapu, V.; Chung, S.M.; Dependable and Secure Computing, IEEE Transactions on vol. 3, Issue: 2; Publication Year: 2006, pp. 156-166.*

An extended object-oriented security model for high secure office environments; Bao-Chyuan Guan; Ping Wang; Chen, S.-J.; Chang, R.-I.; Security Technology, 2003. Proceedings. IEEE 37th Annual 2003 International Carnahan Conference on Publication Year: 2003, pp. 57-61.*

Zhuo, On Fine-Grained Access Control for XML, http://uwspace.uwaterloo.ca/bitstream/10012/1058/1/dhzhuo2003.pdfCHAPTER 2., Waterloo Ontario Canada, 2003, 124 pages.

McCollum, et al., Beyond the Pale of MAC and DAC—Defining New Forms of Access Contmlt, http://ieeexplore.ieee.org/iel2/300/2323/00063850.pdf?isNumber=, Unisys Independent Research and Development,11 pages.

Biskup. et al., Towards a Credential-Based Implementation of Compound Access Control Policies, http://ls6-www.informatik.uni-dortmund.de/issi/archive/literature/2003/Biskup_Wortmann_2003a.pdf, Nov. 11, 2003, 23 pages, Dortmund Germany.

Swift, et al., Improving the Granularity of Access Control for Windows 2000, http://www.cs.wisc.edu/~swift/papers/tissec.pdf, May 2001, 44 pages, Chantilly, VA, 6th ACM Symposium on Access Control Models and Technologies.

How to Manage ACLs, http://www.enterasys.com/support/manuals/RtrSvcsMgr2.1.1/docs/a_ht_manage_acls.html, Last accessed on Jun. 15, 2007, 6 pages.

Ellison, et al., SPKI Certificate Theory, http://www.ietf.org/rfc/rfc2693.txt, Sep. 1999, 41 pages, The Internet Society.

* cited by examiner

ACCESS CONTROL NEGATION USING NEGATIVE GROUPS

BACKGROUND

Computers and computer networks have become ubiquitous in today's society. Virtually every business utilizes computers and computer networks for tasks such as managing inventory, billing, document preparation, product design and/or production and the like. Similarly, educational institutions and nonprofit organizations utilize computers for research, word-processing and other processes. Individuals of all occupations and lifestyles utilize computers and the Internet to manage bank accounts, prepare of tax returns, view product information, sell and purchase products, download audio and video files, take classes, research topics, and find directions among other things. Further, usage of computers and computer networks will continue to flourish as addition information becomes available.

Improvements in interconnectivity and accessibility have also increased utility of computers and computer networks. Users can access resources remotely to retrieve and generate email, edit and/or create documents and perform similar tasks. Mobile devices such as laptops, smartphones, PDAs or a variety of other devices allow users to access the Internet and other networks. The growth of wireless networks has also increased accessibility and therefore utility of computer networks. Many coffee shops, libraries and the like now provide wireless access to customers.

Security and privacy have become critical issues with the increase in collection and accessibility of information. Data can include information crucial to organizations, such as trade secrets, employee information, inventory, customer lists and the like. Data can also include private individual information (e.g., bank records, credit information, and health information). Collection of such personal information has caused concern regarding individual privacy as well as the possibility of identity theft. A key issue is allowing access to individuals or groups of individuals with proper authority, while denying access to any others.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns access management for resources such as computer networks, data files and the like. In general, one or more access control lists can be used to define access to resources for entities and groups of entities. Use of groups generally simplifies ACL definition. Groups are used to reduce the number of Access Control Entries (ACEs) in an ACL. When all members of the group should receive the same access, one ACE specifying access for the group takes the place of the set of ACEs, one per group member, that would otherwise be required. Furthermore, a defined group can change its membership without requiring the ACLs that refer to that group to be modified. Typically, groups are defined as lists of entities.

The systems and methods described herein are directed to managing access to resources utilizing negative groups. A negative group can be defined based upon an existing group, referred as a base group, where the negative group associated with the base group consists of entities that are not included in the base group. The number of entities within a negative group is equal to the number of entities in existence less any entities included in the base group. Similarly, the number of negative groups that a single entity might belong to is equal to the number of non-negative or positive groups in existence minus the number of positive groups to which the entity belongs. It may not reasonable to list all members of a negative group or to list, for any entity, all negative groups to which the entity belongs. Therefore, it can be more efficient to present a record stating membership of an entity in a negative group only when that entity needs that statement in order access a resource. This statement can be provided, upon request, from some service external to the machine where the access decision is made. Alternatively, the statement can be contained in a public key certificate (a digitally signed electronic document issued by a group authority) that can be presented by the entity.

Subtraction groups can also be used to manage access to resources. A subtraction group is defined as the members of a first group, except for any members that also belong to a second group. Members of a subtraction group can also be defined as members of the first group that are also members of the negative of the second group.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
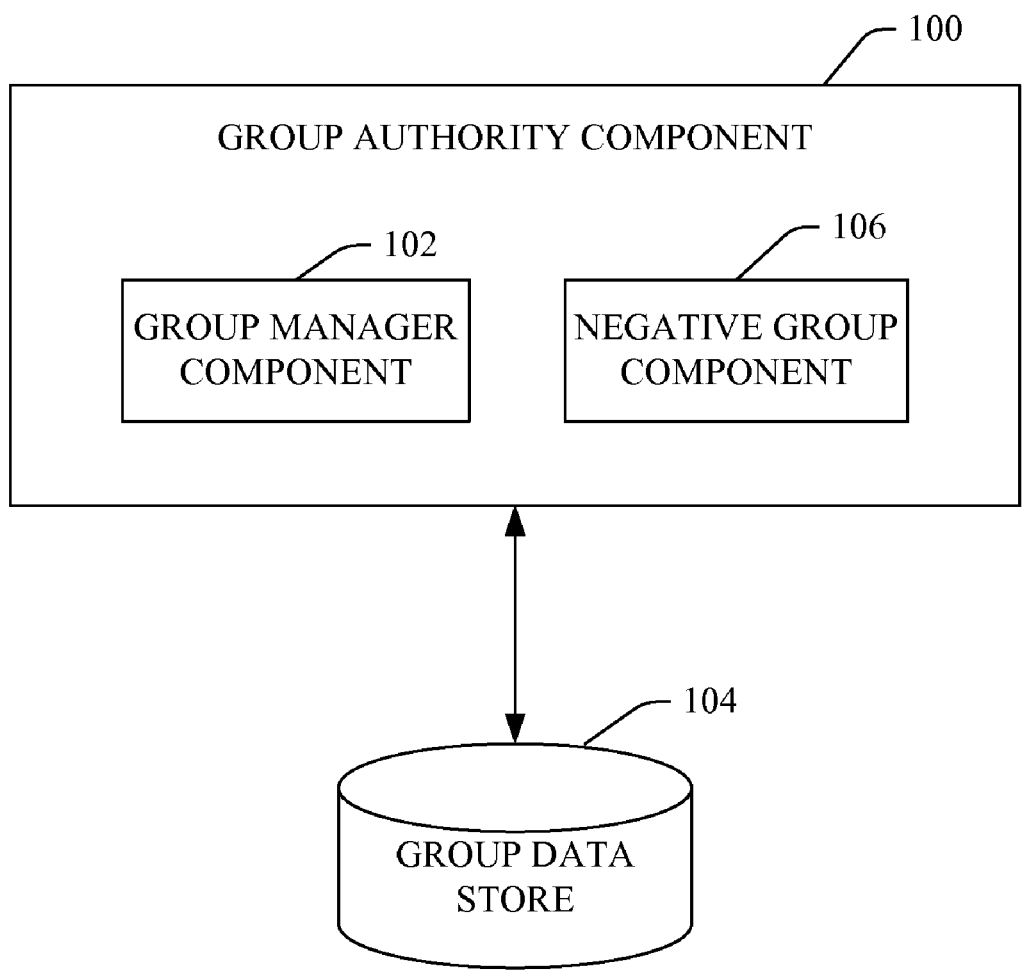
FIG. 1 is a block diagram of a system that facilitates access management utilizing negative groups in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Access Control Lists (ACLs) are frequently used to manage access to resources including, but not limited to, computer networks, data files, software programs, program features, and the like. ACLs have traditionally been interpreted as sequential or order-dependent lists, in which each entry specifies an entity or group of entities and an action to be taken if the current entity requesting access matches that specification. ACL entries are also referred to as Access Control Entries (ACEs). An entity can be considered to match an entry if it is either the entity referenced in the ACL entry or a member of the group specified in the entry. Actions associated with entries can be positive (e.g., allowing a particular access) or negative (e.g., denying a particular access).

Groups of entities can be utilized to facilitate access control. Groups can be used to reduce the number of ACEs in an ACL. When all members of the group should receive the same access, one ACE specifying that access for the group takes the place of the set of ACEs, one per group member, that would otherwise be required. Furthermore, a defined group can change its membership without requiring the ACLs that refer to that group to be modified. For example, a corporation may define individual groups for separate departments within the organization, each group consisting of employees within that department. Access to certain computer networks within the organization may be limited based upon department. For instance, only employees in the accounting or management departments may have access rights to accounting information. Access rights can be updated by modifying the group definitions, rather than requiring update of one or more ACLs. As employees are hired or leave the organization, the employees can be added or deleted from the appropriate department groups.

Groups can also include other groups as members, referred to herein as subgroups. As an example, a group that represents a division of an organization can include each department group within that division. Effectively, the division group consists of all employees in each of the department groups included within the division group.

Groups are often represented as lists of their members. For instance, group members can be explicitly listed in a directory. Multiple ACLs can utilize the same group or groups. Use of groups allows resource access to be changed through update of groups rather than changes to ACLs. Changes to a group definition can affect multiple ACLs, simplifying the update process.

Groups are typically organized within domains. As used herein, a domain is a computer environment, such as a network. Typically, to determine group membership for an entity, a resource manager can obtain a list or report including all groups to which the entity belongs within the domain. This exhaustive list can be used with the ACL to determine access to resources for an entity. The implication of this exhaustive list is that the entity does not belong to any groups not included on the list. However, the scope of the list is limited to the domain for which it is generated. Furthermore, there is only a negative implication that the entity does not belong to groups not included on the list, rather than a positive statement of exclusion from such groups.

When an entity requests access to a resource, the resource can verify access rights based upon an associated ACL. The typical execution model of an ACL sequentially tests entities against entries in the ACL. Entries can be tested from the top down, one at a time. The ACL can be viewed as a series of if-then-else logic statements. If an entry matches the entity making the request, then the associated action is performed and no tests of subsequent entries in the ACL are performed. If the entry does not match the entity requesting access, then the next entry in the list is tested.

A typical ACE can include multiple fields, depending on how data structures are organized. Each ACE can include a subject that identifies an entity or group of entities. During the matching process, the entity seeking access is compared to the entity or members of the group specified in the subject of the entry. Typical ACEs can also include an action, such as ALLOW or DENY. These actions indicate what act is to be performed if the entity requesting access matches the subject. Access can be managed using positive access grants, where an entity or group of entities is specifically allowed access to a resource. Access can also be managed via negation or denial of access to a particular entity or group using DENY actions. An ACE can also include permission information, specifying the type of permission to grant the entity if the action allows access. For instance, an entity may be granted read permission for a data file, but not write permission.

Negative groups are another means for achieving negation. Rather than denying access to an entity that is in a group 'G', an ACE can allow access only to entities that are in a negative group 'not-G'. Negative groups can be based upon any other specified group and consist conceptually of all entities not included within the specified group. This specified group, which serves as a basis for the negative group, is referred to herein as the base group of the negative group. For instance, for a base group 'G', the negative group 'not-G' would include any entities that are not included within base group 'G' or any subgroups that are included in base group 'G'. In addition, the base group could consist of a single entity. For example, for entity 'E' the group 'not-entity E' would include any other entity except for entity 'E'.

FIG. 1 illustrates a group authority component 100 that facilitates access management and provides for negative groups in accordance with an aspect of the subject matter disclosed herein. The group authority component 100 includes a group manager component 102 that manages one or more positive groups that can be maintained in a group data store 104. As used herein, a data store is a collection of data (e.g., a set of files, a database, cache or buffer). A single group data store 104 is depicted for simplicity; however, any number of group data stores can be utilized to manage groups.

Each group can include an identifier (e.g., a Microsoft Windows Security Identifier (SID)) that uniquely identifies the group and can be used to determine the group authority component 100 that defines membership within the group. A group or entity identifier, such as a SID, can include a globally unique identifier that specifies the authority that oversees the group or entity. The identifier can also include a local identifier that is unique with respect to the group authority component for the entity or group. In the Microsoft Windows operating system, a local machine may serve as the authority for SIDs defined on the local machine, whereas a domain controller may act as the authority for SIDs defined within the corporate domain.

The group or groups managed by the group manager component 102 can be utilized by any number of ACLs. Consequently, a single update to the group can affect access to multiple assets and resources. For instance, the group manager component 102 can manage a "Research Department" group that includes all employees that are members of a research team for an organization. The organization can use multiple ACLs to control access to a plurality of computer networks and numerous assets (e.g., documents, records or other data). ACLs can utilize the "Research Department" group to define entities with permission to access certain networks and assets. If an employee joins the research team, the employee may be added to the "Research Department" group and would automatically gain access to assets via ACLs that utilize the Research Department group. Similarly, if an employee leaves the company, access to materials can be revoked without modifying ACLs by removing the individual from the Research Department group.

The group authority component 100 can also include a negative group component 106. The negative group component 106 can effectively define a negative group based upon a pre-existing group. For instance, an entity is considered a member of negative group 'not-G' if the entity does not belong to base group 'G'. The negative group component 106 can determine membership in group 'not-G' by requesting membership information for group 'G' from the group manager component 102. If an entity is a non-member of base group 'G', the entity is considered a member of the negative group 'not-G'. In an extreme example, base group 'G' may include a single entity; consequently, negative group 'not-G' would conceptually consist of all entities except for the single entity within base group 'G'.

Groups are often represented as a list of their members. Typically, a negative group would have a very large list of members. Negative groups would include all entities in existence, except for those contained in the group on which the negative is based. This may be problematic as many systems limit the total number of entities contained within a group. Similarly, the number of negative groups that a single entity might belong to is equal to the number of non-negative or positive groups in existence minus the number of positive groups to which the entity belongs. It may not reasonable to list all members of a negative group or to list, for any entity, all negative groups to which the entity belongs. Therefore, it can be more efficient to present a statement or record declaring membership of an entity in a negative group only when that entity needs that statement in order access a resource. This statement can be provided, upon request, from the group authority component 100 to resource or resource manager where the access decision is made. Alternatively, the statement can be contained in certificate (a digitally signed electronic document issued by a group authority) that can be presented by the entity with an access request.

In aspects, negative groups can be managed using such statements or certificates rather than by explicit listings of members. Members of a negative group can be issued certificates that identify the entity as a member of the negative group. A certificate can act as proof of membership in a negative group. A certificate can include a digital signature that acts as proof that the presented certificate has not been modified and was issued by the appropriate authority, ensuring that presented certificates are valid and generated by the appropriate negative group component 106.

The negative group component 106 can proactively generate group membership statements or certificates for every entity in a negative group. Alternatively, the negative group component 106 can also generate certificates upon request. Certificates can be generated as needed for entities to establish membership necessary to access resources and are not necessarily generated for all entities within the negative group. This is particularly advantageous where the scale of the negative group is large.

Use of statements or certificates to establish membership in a negation group can also improve security and privacy in a multi-domain context. When access is controlled in a single domain, a report listing all groups to which an entity belongs may be acceptable. However, in a multi-domain environment, it is not necessarily desirable to distribute information regarding all groups with which an entity is associated. A statement or certificate can be used to establish that the entity is not a member of a particular base group, without providing any additional information regarding groups within the particular domain. Moreover, statements and certificates can be generated without the exhaustive knowledge required to generate the listing of all groups to which the entity belongs. A statement or certificate can be generated based solely upon the group that is of interest.

Use of group membership statements or certificates also allows for provision of negative group information in a positive manner. The statement or certificate provides positive evidence that the entity is not a member of the base group, rather than a negative implication derived from an exhaustive list of groups to which the entity belongs. In general, there are security advantages to presenting information in a positive manner, rather than relying upon the fact that some data is missing. Usually, it is easier to interfere with transmissions and cause data to be lost than to generate a positive certificate. Use of certificates to implement negative groups provides negative group information in a positive manner, enhancing security.

Figure 2:
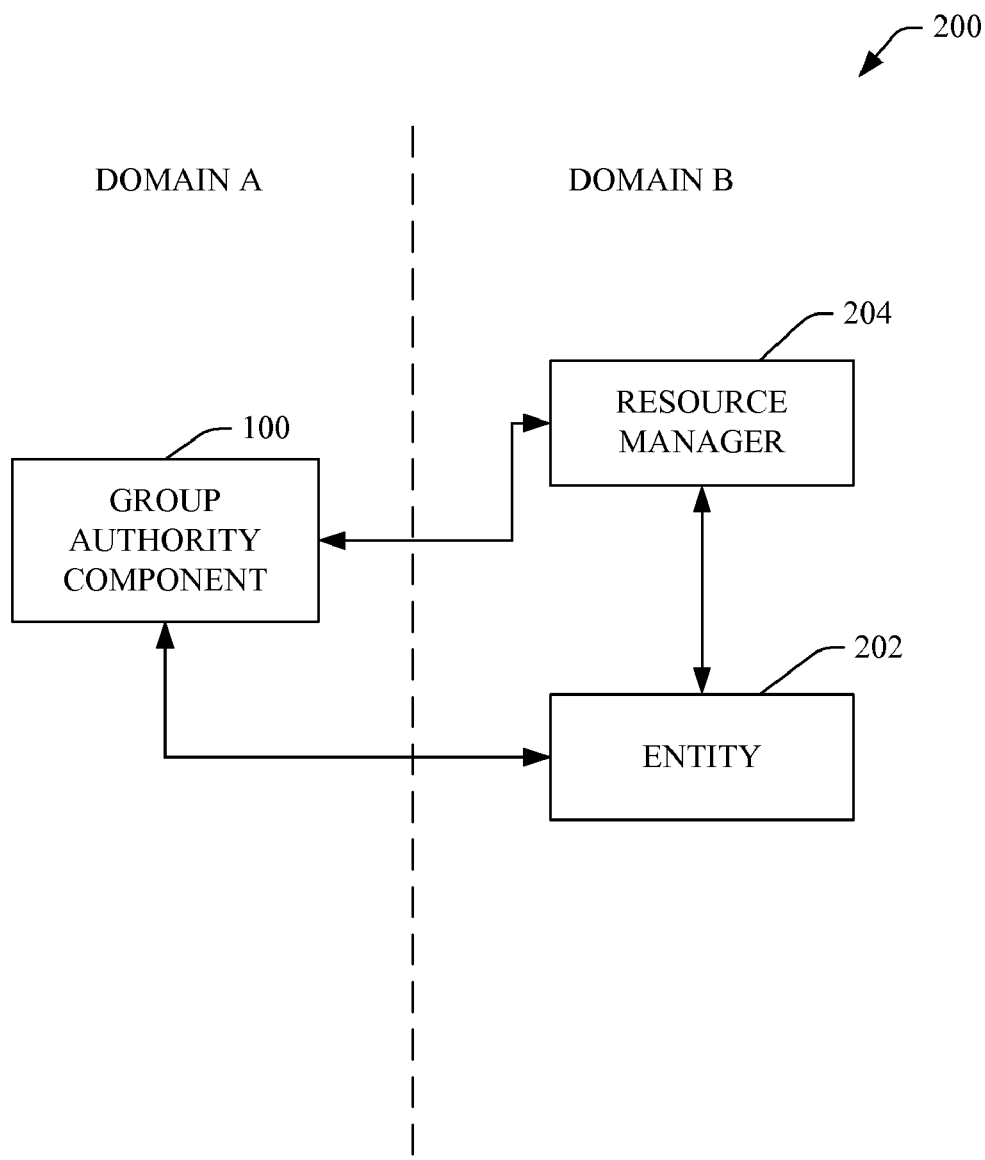
FIG. 2 is a block diagram of an access management system utilizing negative groups in accordance with an aspect of the subject matter disclosed herein.

FIG. 2 illustrates an exemplary access management system 200 utilizing negative groups. A group authority component 100 controls membership in one or more groups, including positive and/or negative groups. The group authority component 100 can generate statements or records declaring membership of an entity 202 in one or more negative groups. These statements of group membership can be used in conjunction with ACLs to determine access to resources.

The group authority component 100 can provide group membership statements, upon request, to a resource or resource manager 204 where the access decision is made. For example, when an entity 202 requests access to a resource, the resource manager 204 can request group membership information from the group authority component 100. The resource manager 204 can determine which group authority component 100 to query for group membership statements based upon the group identifier of the relevant group. As described above, a group identifier can include a globally unique identifier that specifies the group authority component 100 that oversees the group or entity. The identifier can also include a local identifier for the entity or group, where the local identifier is unique with respect to the group authority component 100. The group authority component 100 and resource manager 204 can communicate across domains as illustrated in FIG. 2 or may be collocated within a domain.

Alternatively, the group authority component 100 can provide the statement in a certificate or digitally signed electronic document to the entity 202. Entities can request certificates at any time prior to use of the certificate. When the entity 202 desires access to a resource, the entity 202 can present the certificate, including group membership information, to the resource manager 204. The resource manager 204 can verify the certificate based upon the digital signature and determine access accordingly.

Figure 3:
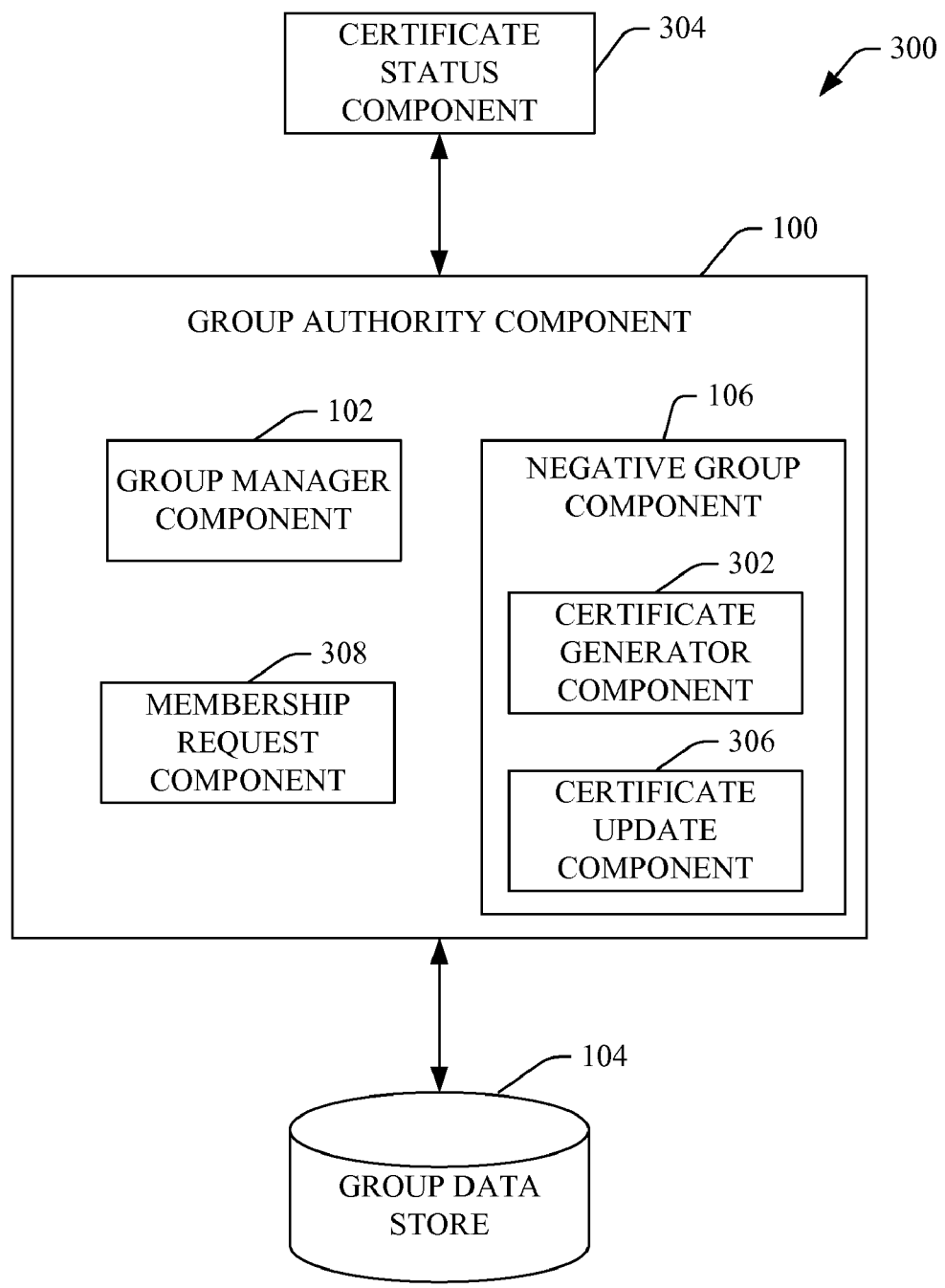
FIG. 3 is block diagram of a system that facilitates access management utilizing online status checks in accordance with an aspect of the subject matter disclosed herein.

Turning now to FIG. 3, an exemplary system 300 that facilitates access management and allows for use of negative groups is illustrated. The group authority component 100 and group data store 104 are similar to group authority component 100 and group data store 104 described with respect to FIG. 1. The negative group component 106 can include a certificate generator component 302 that can generate certificates containing group membership statements. The certificate information can identify a particular entity and a negative group to which the entity belongs. The certificate information can also include a lifetime or specified period of validity during which the certificate is valid. The lifetime can include a start date and time after which the certificate can be used as evidence of group membership, as well as an expiration date and time, after which the certificate is considered invalid.

A certificate status component 304 can maintain information regarding current state of issued certificates (e.g., valid, revoked and/or expired). The certificate status component 304 can obtain information regarding certificates from a certificate update component 306. Furthermore, the certificate status component 304 can obtain information from multiple group authority components (not shown). The certificate status component 304 can be independent of the group authority component 100 as illustrated, or may be a component of the group authority component 100.

The certificate status component 304 allows resource managers to confirm the validity and current state of issued certificates. For example, if a certificate is revoked, the certificate update component 306 can notify the certificate status component 304 of the revocation. If an entity attempts to utilize the certificate after revocation, a resource manager can contact the certificate status component 304 to verify certificate validity, and the certificate can be rejected for invalidity.

The group authority component 100 can also include a membership request component 308 that can request group membership information from other group authority components (not shown). As described above, a group can include one or more subgroups. If these subgroups are managed by the same group manager component 102, the group manager component 102 can determine whether the entity in question is a member of the subgroups. However, a group can also include a subgroup managed by a second, independent group authority component. In such situations, the group authority component 100 that oversees the group is unable to determine whether the entity is a member of the subgroup itself. However, the membership request component 308 can generate a request for membership information and obtain a response indicating whether the entity is a member of the subgroup.

The membership request component 308 can attach a unique label to each request for information to prevent recursion. The subgroup defined by the second, independent group authority component (not shown) may also include one or more subgroups. These subgroups may be managed by the first group authority component 100. Group definitions allow for recursion. There is no mechanism that would prevent two groups from identifying each other as subgroups. The two membership request components 308 could continue to request information without ever resolving membership. However, attachment of a label can be used to prevent recursion. If the second group authority component generates request for information, it will attach the same label that it received. Therefore, if the group authority component 100 receives any requests utilizing a label that it generated or otherwise previously received, the group authority component 100 can stop the recursive processing. A nonce can be used as the unique label. Recursion may be more clearly understood with respect to the example illustrated in FIG. 4.

Figure 4:
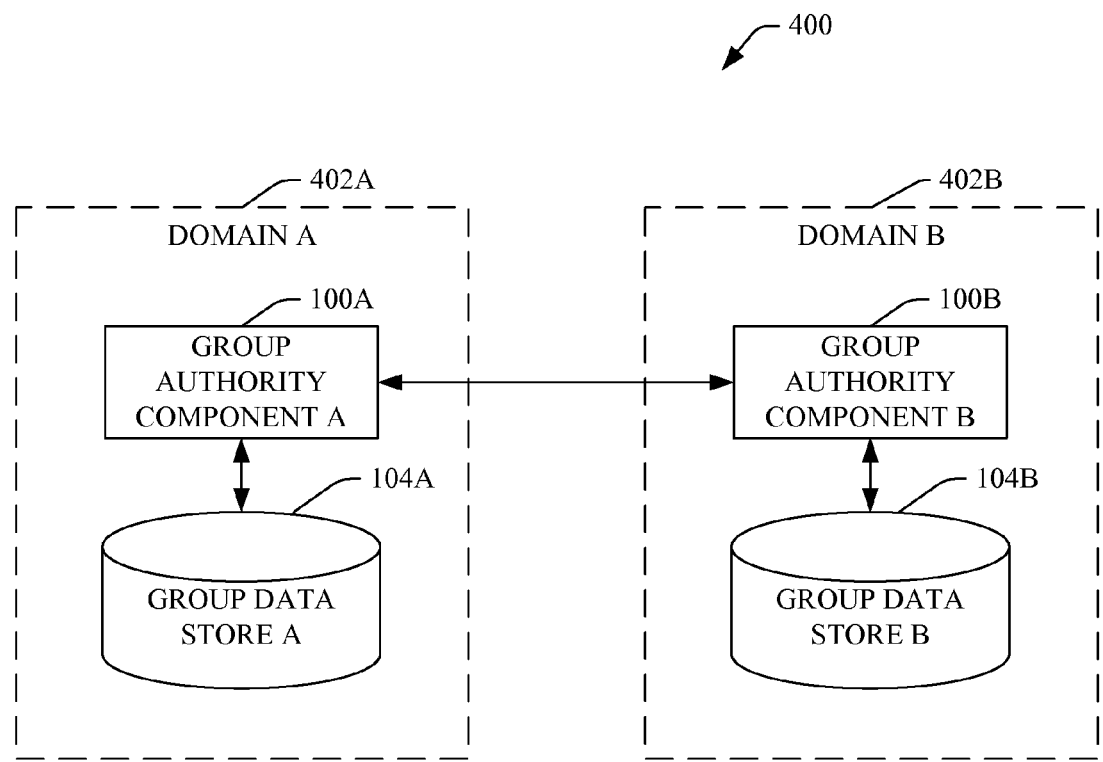
FIG. 4 is a block diagram of a multi-domain system in accordance with an aspect of the subject matter disclosed herein.

Turning now to FIG. 4, an exemplary multi-domain system 400 is illustrated. The system 400 can include any number of domains 402A and 402B. Here, two domains are illustrated for simplicity. Each domain 402A and 402B can represent a computer network maintained by two separate companies, A and B, respectively. Each domain 402A and 402B can include a group authority component 100A and 100B and separate group data store 104A and 104B.

In general, the companies represented by the two domains 402A and 402B may not share resources and assets. However, the companies could be involved in a joint development program. In such circumstances, domain A 402A may create a research group that would include employees of domain B as well as employees of domain A. The research group managed by group authority component A 100A can include a subgroup B managed by the group authority component 100B for domain B 402B. This subgroup B can include employees of B working on the joint research project and with access rights to the joint research materials. Group authority component B 100B can add, delete or modify entities contained in the subgroup B. Consequently, to determine whether an entity is a member of the research group, group authority component A can first determine whether the entity is a member of the groups under its management. If necessary, group authority component A can send a request to group authority component B to determine if the entity is a member of subgroup B.

Problems with recursion can arise during determination of during negative group membership if subgroup B includes a second subgroup A, consisting of employees from domain A. In this case, group authority component B could send a request to group authority component A, continuing the cycle such that membership might never be resolved. To prevent recursion, group authority component A 100A can attach a one-time value or 'nonce' to the request for information regarding membership if subgroup B. If group authority component B 100B generates a request for membership information to determine membership of the entity in subgroup A, the same label can be attached. Consequently, when group authority component A 100A receives the request for membership information, the request is identified as related to the request generated by group authority component A and recursion is prevented.

Figure 5:
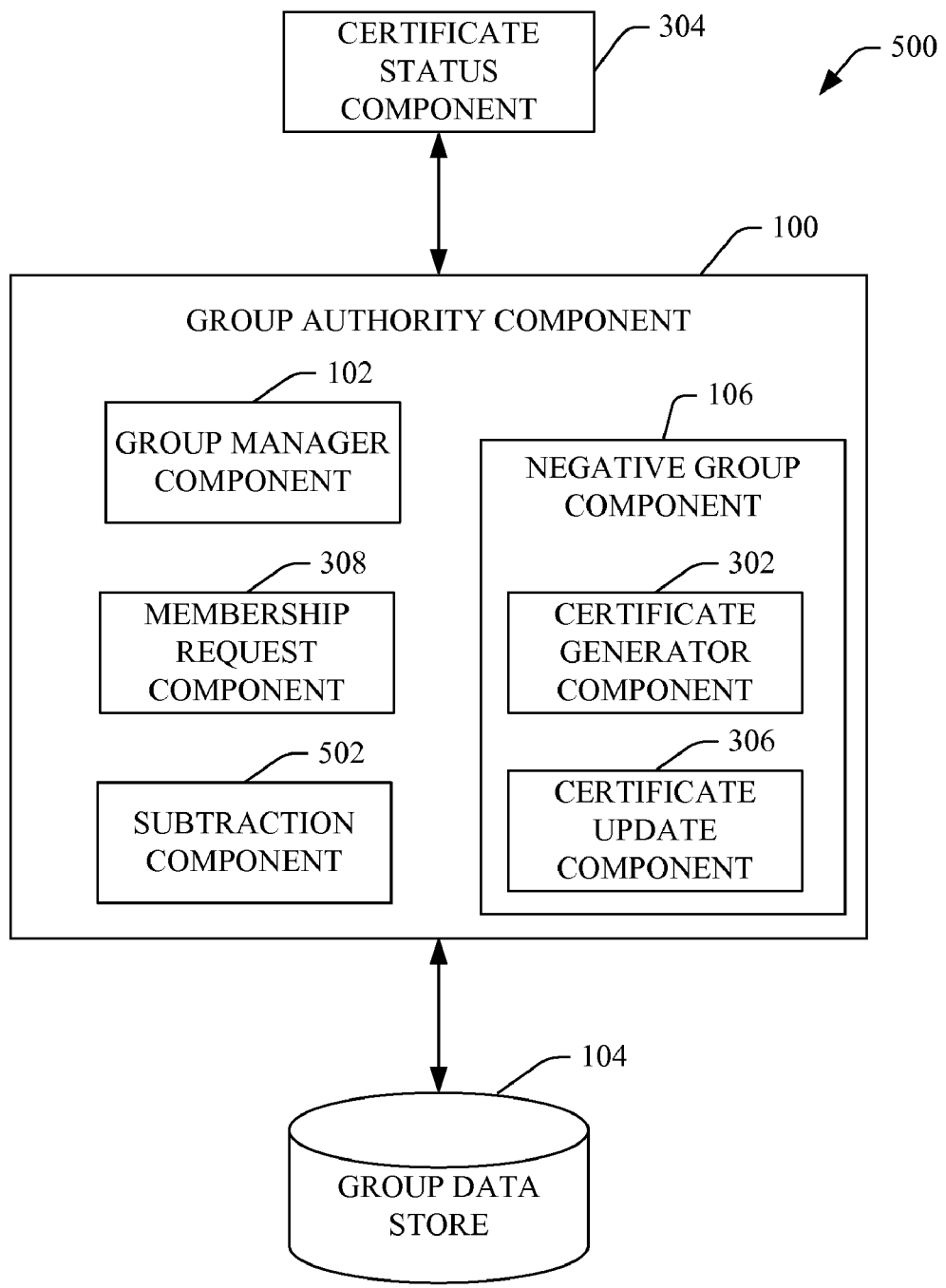
FIG. 5 is block diagram of a system that facilitates access management utilizing subtraction groups in accordance with an aspect of the subject matter disclosed herein.

Referring now to FIG. 5, a system 500 that facilitates access management utilizing subtraction groups in accordance with an aspect of the subject matter disclosed herein is illustrated. The group authority component 100 can also include a subtraction component 502. The subtraction component 502 can define a subtraction group, based upon at least two pre-existing groups. For instance, an entity is considered a member of subtraction group 'A-B', if the entity is in group 'A', but not in group 'B'. The subtraction component 502 can determine membership in group 'A-B' by requesting membership information for group 'A' and for group 'B' from the appropriate group manager component. It is important to note that group 'A' and group 'B' can be managed by different group manager components.

If an entity is not a member of group 'A', the entity will not be a member of the subtraction group 'A-B'. If the entity is a member of group 'A', then the subtraction component determines whether the entity is a member of the negative group 'not-B'. If the entity is a member of group 'A' and it is also a member of group 'not-B', then the entity is a member of subtraction group 'A-B.'

Unlike negative groups, subtraction groups have a fixed limit on the number of members within the subtraction group. For instance, subtraction group 'A-B' cannot have more members than group 'A'. Because the subtraction group is limited, it can be expressed as a list of members and may be maintained in a group data store 104 or other data store. Alternatively, certificates can be used as evidence of membership in a subtraction group.

Figure 6:
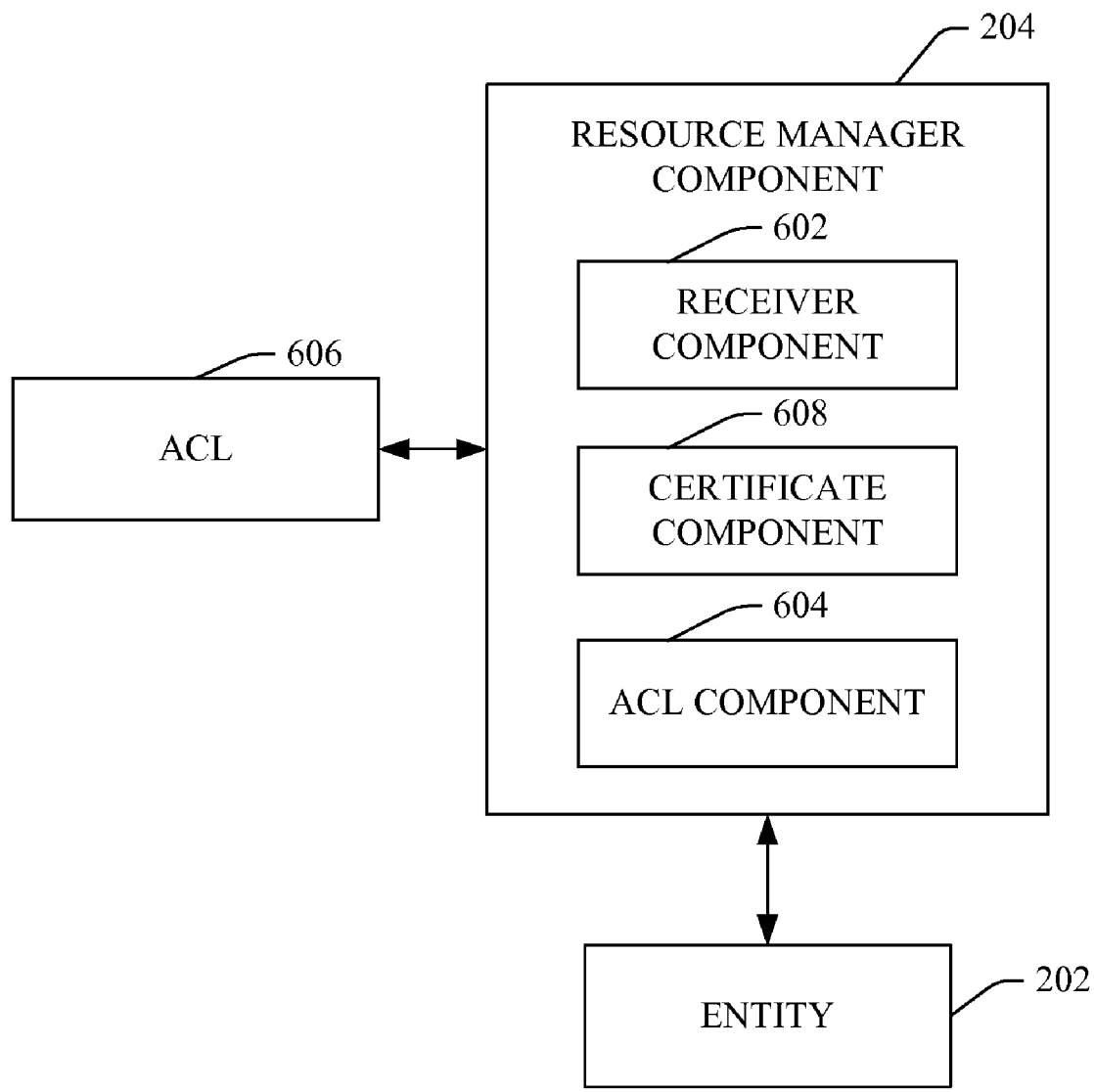
FIG. 6 is a block diagram of a system that manages access for a resource in accordance with an aspect of the subject matter disclosed herein.

Referring now to FIG. 6, an exemplary resource manager component 204 capable of handling negative groups is illustrated. The resource manager component 204 can include a receiver component 602 that can receive requests to access resources, including, but not limited to, network access and document access (e.g., word-processing documents, spreadsheets and the like). The requests can be received from one or more entities 202 (e.g., individuals and automated software programs). Access requests can include information identifying the entity 202 as well as the requested resource. In addition, an access request can include a certificate identifying the entity as a member of a negative group.

The resource manager component 204 can also include an ACL component 604 that can request access information for a particular resource. The ACL component 604 can contact the ACL 606 authority and obtain information regarding entities with the right to access the resource. The ACL component 604 can obtain information regarding entities, including groups that have permission to access a particular resource. The access information can include negative groups and subtraction groups as well as conventional groups.

Resource manager component 204 can include a certificate component 610 that evaluates received negative group and subtraction group certificates. The certificate component 608 can decrypt or read the certificate to ensure that the certificate applies to the entity requesting access and that the certificate is valid. Certificates can be limited to a specific period of time, referred to herein as the certificate lifetime. After the certificate lifetime, the certificate is expired and can no longer be used as evidence of negative group membership. Also, the certificate lifetime can specify a commencement time and date. Prior to commencement of the certificate lifetime, the certificate cannot be used as evidence of negative group membership. The certificate component 608 can determine whether the certificate has expired or whether it is not yet valid.

Figure 7:
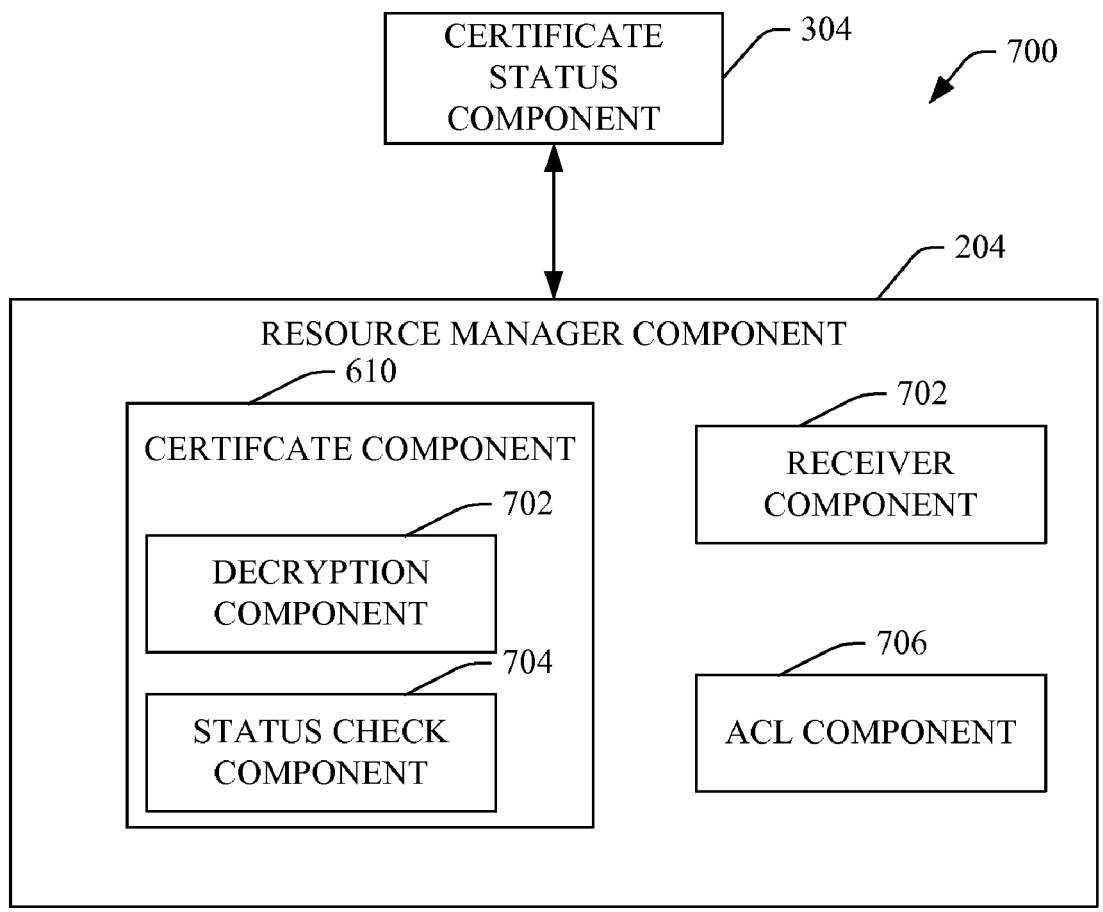
FIG. 7 is a block diagram of a system that manages access for resources utilizing online status checking in accordance with an aspect of the subject matter disclosed herein

Referring now to FIG. 7, an exemplary system 700 that verifies certificate status is illustrated. The system 700 can include a resource management component 204 as described with respect to FIG. 6. In addition, the certificate component 608 can include a decryption component 702 that is capable of decrypting received certificates to evaluate the certificate validity. For example, decrypted contents of the certificate can verify the entity, The certificate component 608 can also include a status check component 704 that checks whether the certificate is valid. The status check component can contact a certificate status component 304 to verify that the certificate has not been revoked. The certificate status component 304 can maintain status for certificates issued by one or more group authority components, similar to an online certificate status protocol (OCSP).

In other aspects, the certificate may not be presented to the resource manager component 204 by the entity. The certificate component 608 can request the certificate from the group authority component directly. Alternatively, an intermediary component (not shown) can manage a set of certificates for one or more entities. The resource manager component 204 can obtain negative group or subtraction group certificates from the intermediary component upon request.

Figure 8:
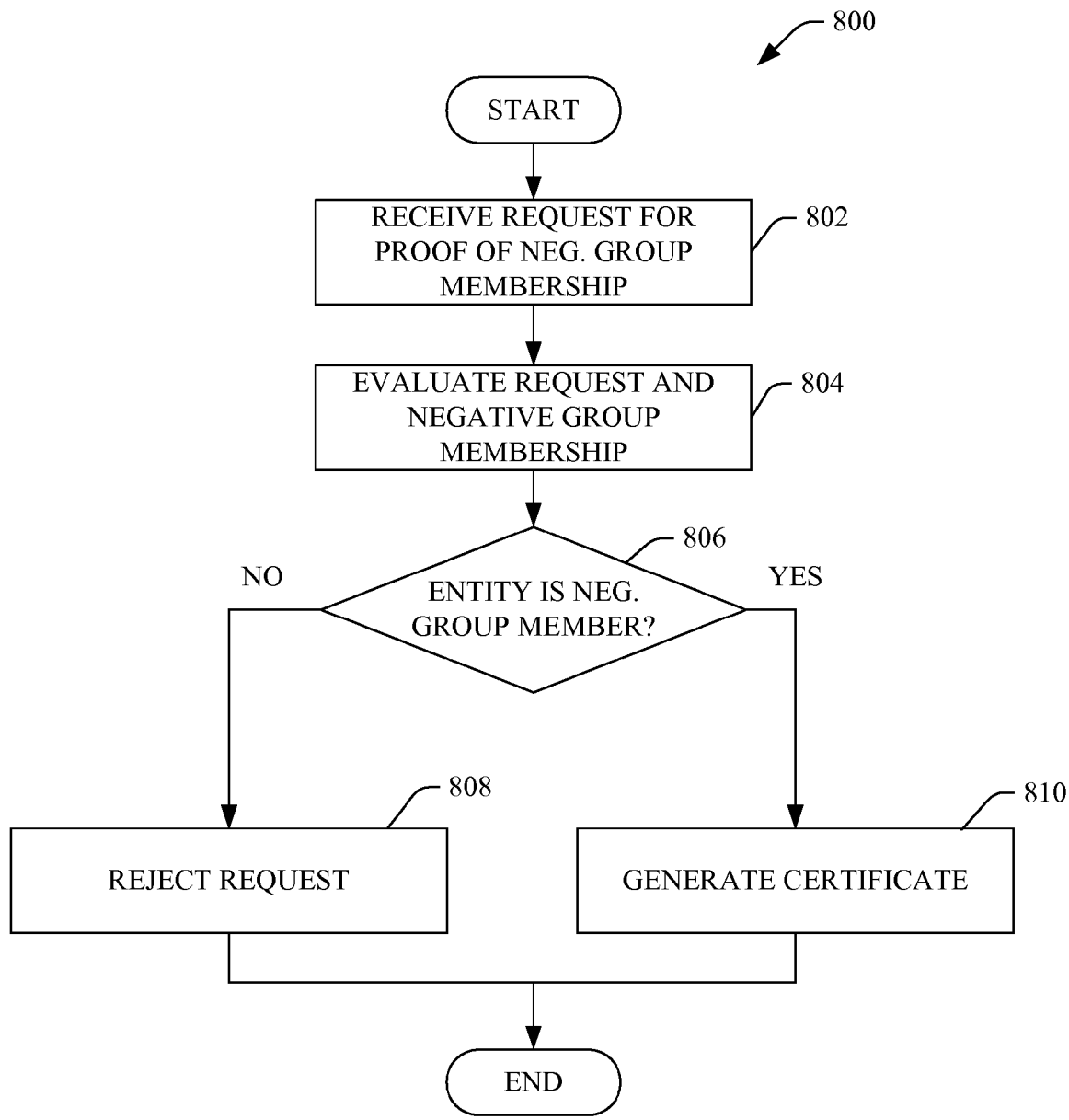
FIG. 8 illustrates an exemplary methodology for establishing membership in a negative group in accordance with an aspect of the subject matter disclosed herein.

Referring now to FIG. 8, an exemplary methodology 800 for determining membership in a negative group is illustrated. At 802, a request for evidence of negative group membership is received. The request can be received from an entity seeking membership, or from a resource manager seeking evidence of negative group membership for an entity. A group manager with authority over the group upon which the negative group is based can process the received request. For example, if a group manager has the authority to determine membership in group 'A', the group manager also has the authority to determine membership in negative group 'not-A'. The appropriate group manager can be identified based upon the group identifier, which includes a globally unique identifier for the group manager with authority over the group.

At 804, the request can be analyzed to determine whether the entity associated with the request is a member of the negative group. In particular, a group manager component can evaluate the base group associated with the negative group. At 806, a determination is made as to whether the entity is a member of the negative group. In particular, if the entity does not belong to the base group, the entity is determined to be a member of the negative group.

If the entity is a member of the base group and therefore, not a member of the negative group, the request for membership is rejected at 808. Rejection can include notification of the resource manager. Alternatively, rejection can consist of a simple refusal to supply the certificate of membership.

If the entity is deemed a member of the negative group, a certificate can be generated at 810. The certificate can provide evidence that a particular entity is a member of the negative group. The certificate can be encrypted such that entities are incapable of modifying a certificate and/or generating false certificates. Resource managers can decrypt certificates and/or obtain the information in decrypted certificates to verify group membership and determine access for entities.

Figure 9:
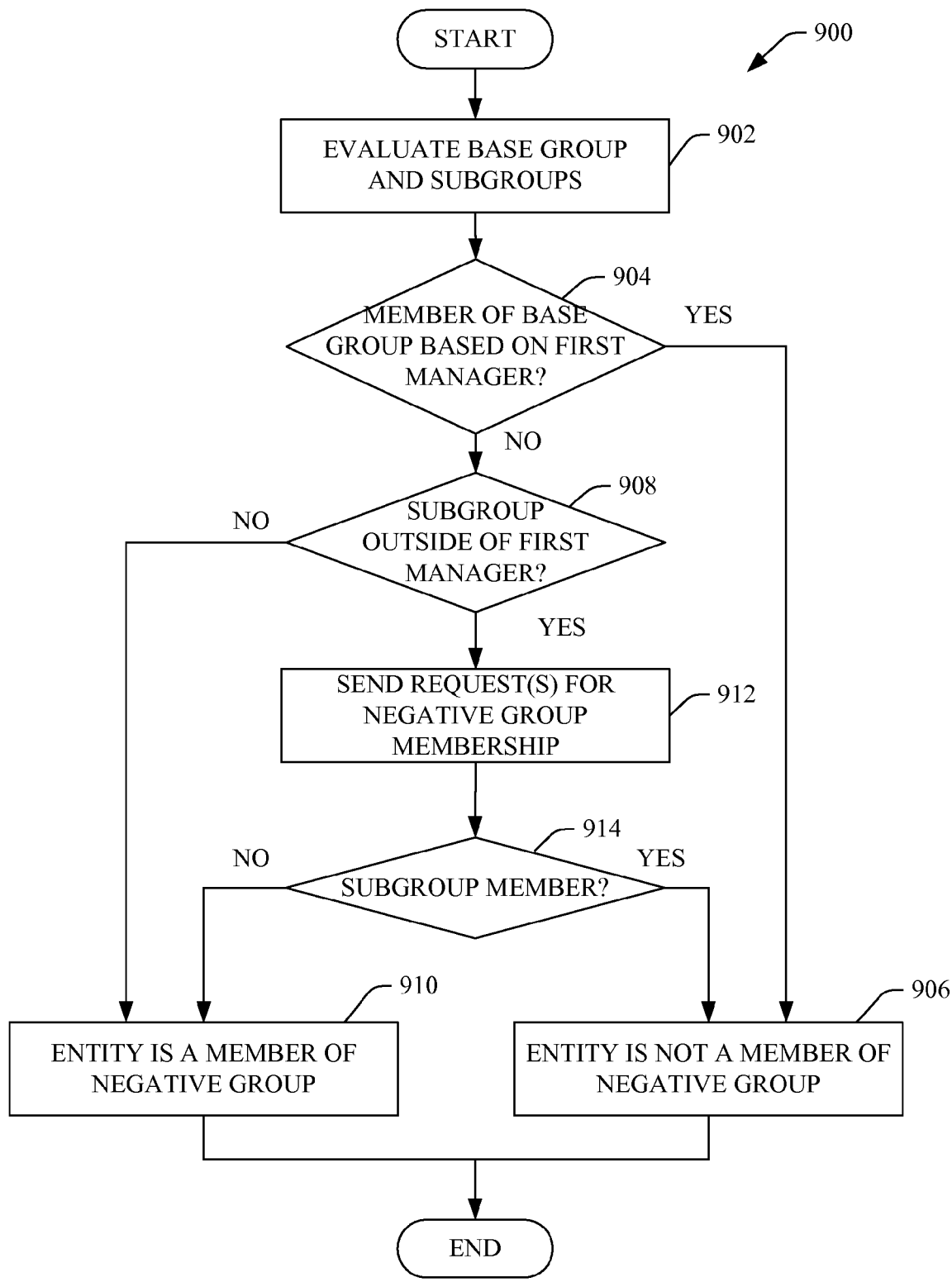
FIG. 9 illustrates an exemplary methodology for processing negative group membership in accordance with an aspect of the subject matter disclosed herein.

FIG. 9 illustrates an exemplary methodology 900 for determining negative group membership in accordance with an aspect of the subject matter disclosed herein. At 902, a group manager with authority over the base group associated with the negative group can evaluate members of base group to determine whether the entity in question is a member of the base group. This can also include determining whether the base group contains subgroups. If the group manager also has authority over any such subgroups, the group manager can evaluate the subgroups to determine whether the entity is a member of a subgroup of the base group.

At 904, a determination is made as to whether the entity is member of the base group or its subgroups, based solely upon information managed by the group manager with authority over the base group. If yes, then the entity cannot be a member of the negative of the base group and the process continues at 906 where the group manager establishes that the entity is not a member of the negative group.

In a multi-domain environment, it is possible that the base group can include a subgroup controlled by a second, independent manager. In this case, the first group manager cannot make a definitive decision as to group membership without consulting this second manager. At 908, a determination is made as to whether there are subgroups beyond the authority of the first group manager. If no, then the entity is a member of the negative group at 910, since the first group manager has determined that the entity is not a member of the base group or subgroups under the group manager's authority and there are no other relevant authorities.

If there are subgroups over which the first group manager has no authority, at 912 the first group manager can generate one or more requests to other managers requesting certificates that indicate the entity is not a member of the subgroups of the base group. In particular, for each subgroup defined by a manager other than the first group manager, the first group manager can generate a request that asks the manager of the subgroup for a certificate proving that the entity is not a member of the subgroup.

Each request to a manager of a subgroup can be marked with a unique identifier, or one time label. For instance, a separate nonce can be generated for each such request. This nonce label can be used to prevent recursion. For example, if the subgroup contains a second subgroup defined by the original, first group manager, the first and second managers could continue to exchange requests without resolving membership. If managers other than the first manager request information from other managers to determine membership, the requests can include the same nonce. Any manager that has transmitted a request with a particular nonce and receives a request labeled with the same nonce will return an indication that processing of requests has become recursive.

Alternatively, stacks can be used to prevent recursive processing. Each request can include a stack of nested groups. If a query is about to make a request regarding a group that is already included in the stack, the request can be cancelled. Instead, the group authority component can wait to receive a response from farther up on the stack. The process of recursively requesting if the subject entity is a member of any of the subgroups can terminate early if any group authority responds with a statement that the entity is a group member. However, if no authorities respond that the entity is a group member, and the recursive processing terminates, then the entity is not a member of the group in question.

At 914, a determination is made as to whether the entity is a member of subgroup issued by another authority. If at the end of examining all defined members of a group, all responses were either certificates of non-membership or indicia of recursion, then it is determined that the entity is not a member of the base group, and is therefore a member of the negative group at 910. Otherwise, the entity is a member of a subgroup and therefore not a member of the negative group at 906.

Figure 10:
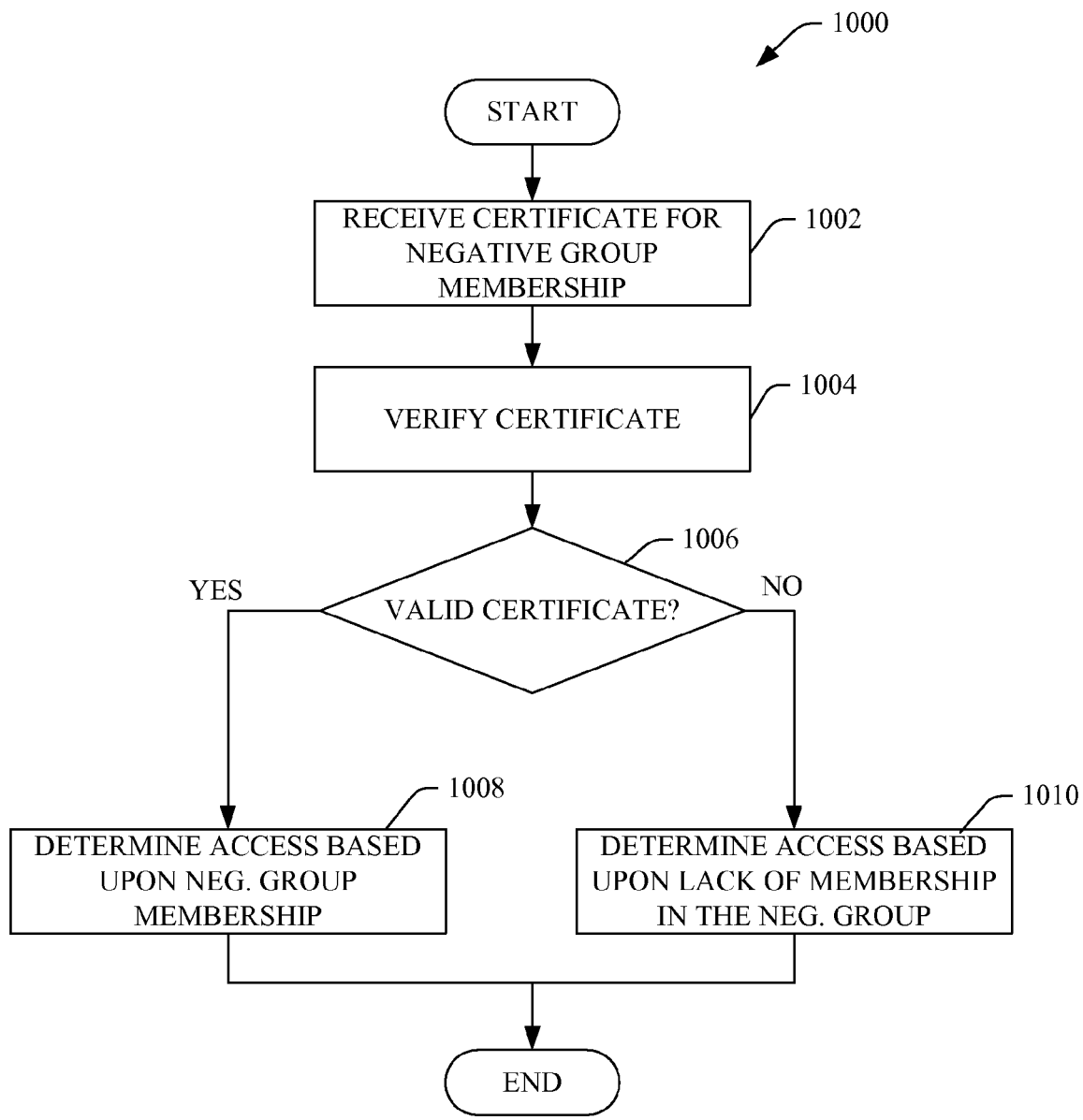
FIG. 10 illustrates an exemplary methodology for determining access utilizing negative group membership in accordance with an aspect of the subject matter disclosed herein.

Turning now to FIG. 10, an exemplary methodology for determining access to a resource utilizing negative groups is illustrated. At 1002, a certificate providing evidence of membership in a negative group is presented. The certificate can be obtained from the entity to which the certificate refers, from an issuing authority or from an intermediary.

At 1004, the certificate can be verified. Verification can include decryption of the certificate to ensure that the certificate references the entity and the negative group in question. In addition, the certificate can be time sensitive and can include an expiration time. Verification can include determining whether the certificate has expired. In other aspects, verification can include on online status check of the certificate. A certificate status component can be queried to verify current status of the certificate and ensure that the certificate has not been revoked.

At 1006, a determination is made as to whether the certificate is valid based upon the verification. If the certificate is valid, the entity is determined to be a member of the negative group at 1008 and access is determined based upon membership in the negative group. If the certificate is not valid, the entity is not a member of the negative group at 1010 and access can determined based upon lack of membership in the negative group. Access to resources can be determined based upon membership determination and information within the relevant ACL.

Figure 11:
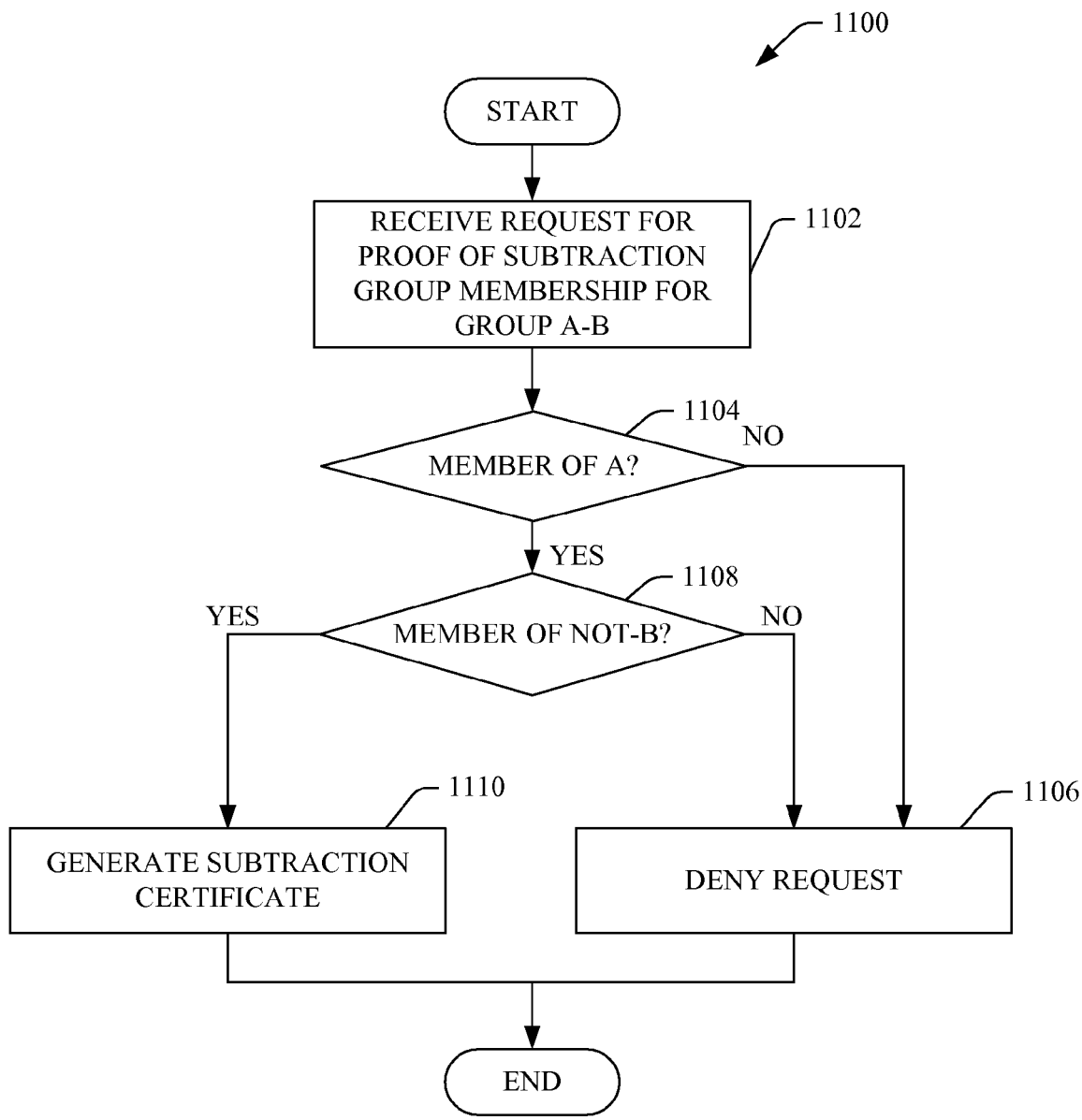
FIG. 11 illustrates an exemplary methodology for determining membership in a subtraction group in accordance with an aspect of the subject matter disclosed herein.

Referring now to FIG. 11, an exemplary methodology 1100 for determining subtraction group membership is illustrated. At 1102, a request is received for proof of membership of an entity in a subtraction group 'A-B'. The entity belongs to subtraction group 'A-B' if the entity belongs to group A, but not group B. At 1104, a determination is made as to whether the entity is a member of group A. For instance, the group manager responsible for group A can be queried to determine membership in group A If the entity is not a member of group A, then the entity cannot belong to the subtraction group 'A-B'. Therefore, the request for proof of membership in the subtraction group is denied at 1106. If the entity is a member of the group A, then at 1108 a determination is made as to whether the entity is a member of negative group 'not-B.' If the entity is a member of group A and group 'not-B', then the entity is a member of the subtraction group 'A-B' and a certificate can be generated at 1110. However, if the entity is not a member of the group 'not-B', the entity is a member of both groups A and B. Consequently, the entity will not be a member of the subtraction group 'A-B' and the request for a certificate is denied at 1106.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 12:
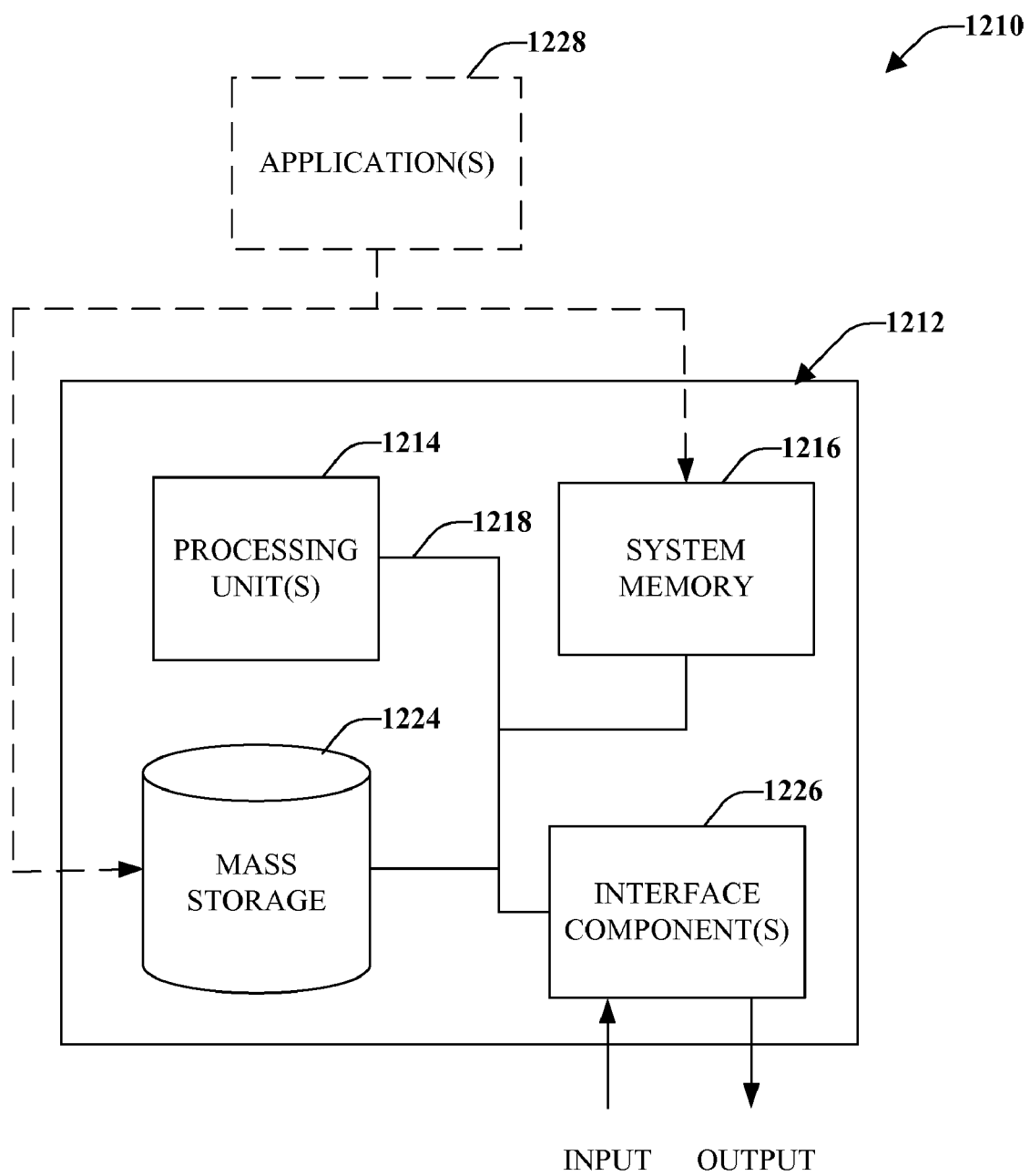
FIG. 12 is a schematic block diagram illustrating a suitable operating environment.
Figure 13:
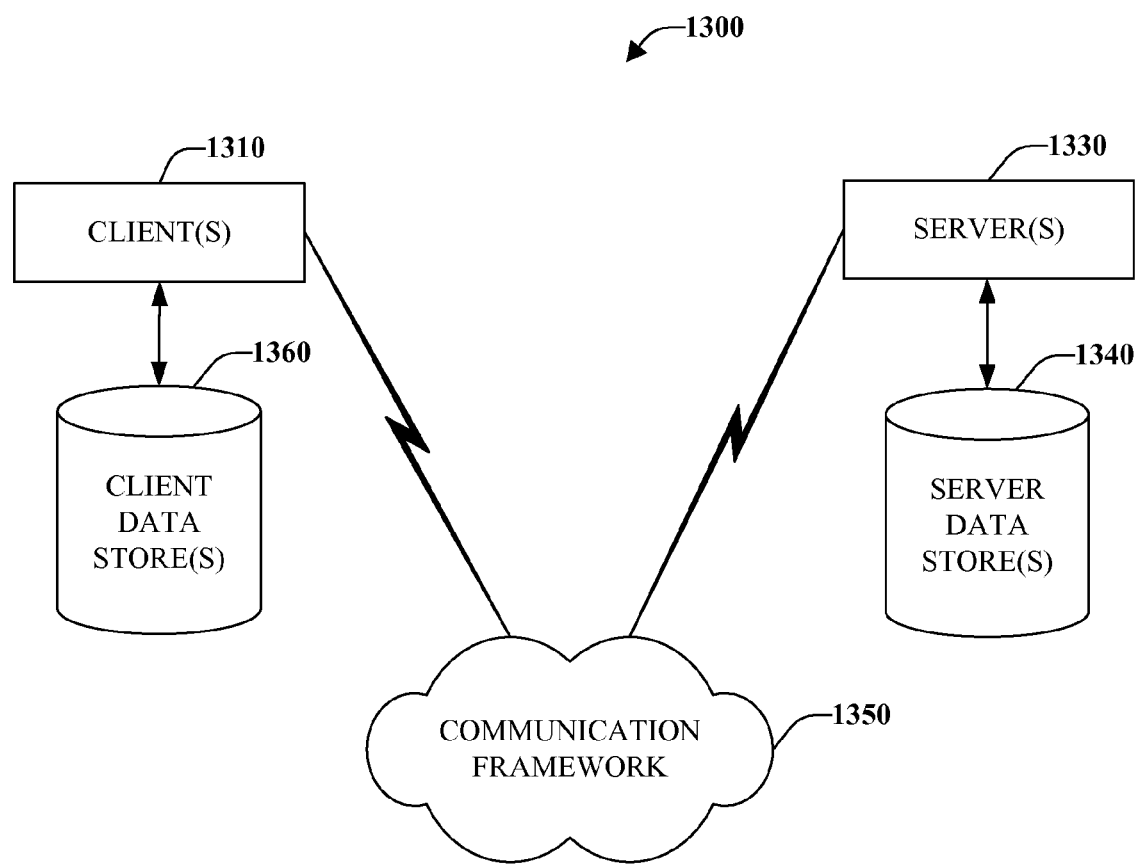
FIG. 13 is a schematic block diagram of a sample-computing environment

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject matter described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. In particular, operating system can include diagnostic components capable of monitoring and averting failure of a hard disk drive. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g., CRT, LCD, plasma . . . ), speakers, printers and other computers, among other things.

FIG. 13 is a schematic block diagram of a sample-computing environment 1300 with which the subject matter can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client (s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330. Both the one or more client data store(s) 1360 and the one or more server data store(s) can utilize hard disk drives to maintain data. Both client(s) 1310 and server(s) 1330 can utilize a diagnostic component to prevent failure of data stores and mitigate loss of data.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that facilitates group management for use access control, comprising:
   a group manager component that specifies a base group comprising at least one first entity, wherein the base group is associated with a negative group comprising at least one second entity that is excluded from the base group; and
   a negative group component that determines membership of an entity in the negative group as a function of non-membership of the entity in the base group, wherein
   the negative group component issues a statement that indicates the membership of the entity in the negative group, and
   the statement is used to provide access to a resource for the entity.

2. The system of claim 1, further comprising a certificate generator component that generates a certificate that identifies the entity as a member of the negative group.

3. The system of claim 2, wherein the certificate includes a defined lifetime during which the certificate is valid.

4. The system of claim 2, further comprising a certificate update component that notifies a certificate status manager of a current state of the certificate, wherein a resource manager can contact the certificate status manager to verify validity of the certificate.

5. The system of claim 1, wherein the base group includes at least one subgroup and the negative group component determines membership of the entity in the negative group as a function of exclusion of the entity from the at least one subgroup.

6. The system of claim 5, further comprising a membership request component that generates a request for membership information for the entity, the request is submitted to an independent group manager, wherein the at least one subgroup is managed by the independent group manager.

7. The system of claim 6, wherein the request includes a label that allows the group component to identify a recursive request for membership information.

8. The system of claim 1, further comprising a subtraction component that determines membership of the entity in a subtraction group that is based upon a first group and a second group, wherein the membership of the entity in the subtraction group is determined as a function of inclusion of the entity in the first group and exclusion of the entity from the second group.

9. The system of claim 8, wherein the subtraction component determines the membership in the subtraction group based at least in part upon membership of the entity in a second negative group based upon the second group.

10. The system of claim 8, wherein the subtraction component generates a certificate that indicates membership of the entity in the subtraction group.

11. The system of claim 8, wherein the subtraction component includes the entity in a list of members of the subtraction group.

12. A method for determining access groups to facilitate access management, the method comprising:
   obtaining a certificate indicating membership of an entity in a negative group and generated for the entity as a function of non-membership of the entity in the base group associated with the negative group, wherein the certificate is used to determine access to a resource for the entity;
   verifying the certificate; and
   when the certificate is verified, allowing access to the resource for the entity as a function of the certificate.

13. The method of claim 12, further comprising receiving the certificate from the entity.

14. The method of claim 12, further comprising:
   receiving a request for access to the resource from the entity; and
   requesting the certificate from an issuer that determines membership of the entity in the negative group.

15. The method of claim 12, further comprising evaluating a validity period specified within the certificate to determine validity of the certificate.

16. The method of claim 12, further comprising:
   requesting a current status of the certificate; and
   determining validity of the certificate as a function of the current status.

17. The method of claim 12, further comprising obtaining access control list information, wherein access determination is a function of the access control list information and membership of the entity in the negative group.

18. The method of claim 12, further comprising decrypting the certificate to verify that the certificate is applicable to the negative group and the entity.

19. An apparatus for managing access to resources, the apparatus comprising:
   means for determining membership of an entity in a subtraction group based on membership of the entity in a first group and non-membership of the entity in a second group; and means for issuing a certificate indicating the membership of the entity in the subtraction group.

20. The apparatus of claim 19, wherein the membership of the entity in the subtraction group is determined based upon membership of the entity in the first group and membership of the entity in a negative group based upon the second group.

* * * * *